(12) United States Patent
Ezura et al.

(10) Patent No.: US 7,489,427 B2
(45) Date of Patent: Feb. 10, 2009

(54) HOLOGRAM RECORDING DEVICE, HOLOGRAM REPRODUCTION DEVICE, HOLOGRAM RECORDING METHOD, AND HOLOGRAM REPRODUCING METHOD

(75) Inventors: Megumi Ezura, Tokyo (JP); Tomoki Kanesaka, Miyagi (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 237 days.

(21) Appl. No.: 11/281,464

(22) Filed: Nov. 18, 2005

(65) Prior Publication Data

US 2006/0126143 A1 Jun. 15, 2006

(30) Foreign Application Priority Data

Nov. 29, 2004 (JP) ............................. 2004-343365

(51) Int. Cl.
 *G03H 1/10* (2006.01)
 *G03H 1/26* (2006.01)
(52) U.S. Cl. ............................ 359/10; 359/22; 359/35

(58) Field of Classification Search .................. 359/10, 359/11
See application file for complete search history.

(56) References Cited

U.S. PATENT DOCUMENTS 5,120,621 A * 6/1992 Ramsbottom .................. 430/1
5,777,760 A * 7/1998 Hays et al. ..................... 359/7

* cited by examiner

*Primary Examiner*—Audrey Y Chang
(74) *Attorney, Agent, or Firm*—Oblon, Spivak, McClelland, Maier & Neustadt, P.C.

(57) ABSTRACT

In recording of an interference fringe of a reference beam and a signal beam in a hologram recording medium, at the time of multiple recording of holograms in the same recording region by varying the angle of incidence of the reference beam on the hologram recording medium, the angular pitch of the incidence angle of the reference beam is varied according to the incidence angle of the reference beam in the manner of $\Delta\theta 1$, $\Delta\theta 2, \ldots, \Delta\theta m-1$, and is thereby set to a minimum in such a range as not to worsen crosstalk. This makes it possible to increase the degree of multiplexing when the movable angle of the reference beam is the same, and to narrow the movable angle of the reference beam when the degree of multiplexing is the same, as compared with the related art.

8 Claims, 6 Drawing Sheets

| MULTIPLE RECORDING | REFERENCE BEAM INCIDENCE ANGLE |
|---|---|
| 1st data page | $\theta_1$ |
| 2nd data page | $\theta_2 = \theta_1 + \Delta\theta_1$ |
| 3rd data page | $\theta_3 = \theta_2 + \Delta\theta_2$ |
| ⋮ | ⋮ |
| mth data page | $\theta_m = \theta_{m-1} + \Delta\theta_{m-1}$ |

| DATA PAGE TO BE REPRODUCED | REPRODUCTION REFERENCE BEAM INCIDENCE ANGLE |
|---|---|
| 1st data page | $\theta_1 + \delta\theta$ |
| 2nd data page | $\theta_1 + \Delta\theta_1 + \delta\theta$ <br> $= \theta_2 + \delta\theta$ |
| ⋮ | ⋮ |
| mth data page | $\theta_{m-1} + \Delta\theta_{m-1} + \delta\theta$ <br> $= \theta_m + \delta\theta$ |

FIG.9

| MULTIPLE RECORDING | REFERENCE BEAM INCIDENCE ANGLE |
|---|---|
| 1st data page | $\theta_1$ |
| 2nd data page | $\theta_2 = \theta_1 + \Delta\theta$ |
| 3rd data page | $\theta_3 = \theta_2 + \Delta\theta$ |
| ⋮ | ⋮ |
| mth data page | $\theta_m = \theta_{m-1} + \Delta\theta$ |

HOLOGRAM RECORDING DEVICE, HOLOGRAM REPRODUCTION DEVICE, HOLOGRAM RECORDING METHOD, AND HOLOGRAM REPRODUCING METHOD

BACKGROUND OF THE INVENTION

The present invention relates to a hologram recording and reproduction devices and methods for multiple recording of an interference fringe of a reference beam and a signal beam on a hologram recording medium by an angle multiplex system, particularly to the setting of the angular pitch of the angle of incidence of the reference beam on the hologram recording medium.

As described, for example, in IBM J. RES. DEVELOP Vol. 44, No. 3, May 2000, "Holographic data storage", holographic data storage is the technology of disposing a hologram recording medium in a region where two luminous fluxes of a signal beam and a reference beam interfere with each other to thereby record an interference fringe of the two luminous fluxes on the hologram recording medium. In this case, for enhancing the recording density on the hologram recording medium, multiple recording of holograms is performed by any of various multiplexing systems including not only angle multiplex system but also shift multiplex system, speckle multiplex system, and phase encoding multiplex system.

In any of the multiplexing systems, the basic configuration of the hologram recording/reproduction device can be deemed substantially the same, except for the kind of the reference beam wave front which determines the principle of multiplexing. As a representative of these systems, there is the holographic storage recording/reproduction device based on the angle multiplex system. In this technology, the hologram recording medium is irradiated with two luminous fluxes of a signal beam and a reference beam, and the angle of incidence of the reference beam on the hologram recording medium is varied each time of spatial modulation (intensity modulation) of the signal beam according to a data page displayed on a spatial modulator (SLM) to thereby achieve multiple recording of holograms in the same recording region. Recorded on the hologram recording medium are Fourier images of two-dimensional bit data images (data pages) displayed on the SLM. In addition, the reproduced signals are data page images obtained by inverse Fourier transform of a diffracted beam, which are picked up by an image pickup device such as CCD, and are taken into a computer as bit patterns.

The multiple recording by the angle multiplex system is including the reference beam constituted of a plane wave is reflected by a rotating mirror (or galvano mirror) to vary the angle of incidence on the recording medium, whereby a number of sheets of holograms can be multiply recorded in the same region. This is made possible by the angle selectivity which is a characteristic feature of the volume hologram.

Here, the angle selectivity means the phenomenon in which at the time of reproducing a certain single sheet of hologram, the diffraction efficiency shows a behavior according to a Sin c function with the amount of deviation of the reproduction reference beam from the recording reference beam angle as a variable. To be more specific, let the recording wavelength of the hologram be $\lambda$, let the thickness of the recording medium (recording material) be T, the incidence angles of the signal beam and the reference beam be respectively $\theta_o = \theta_r = \theta$, then the diffraction efficiency $\eta$ varies according to the following formula in relation to the angle variation $\Delta\theta$ of the reproduction reference beam:

$$\eta \propto \sin c^2 (2T(\Delta\theta)\sin\theta/\lambda) \quad (1)$$

For example, the relationship between the diffraction efficiency of holograms recorded under the conditions of a recording wavelength of 532 nm, a recording medium thickness of 1 mm, and signal beam and reference beam incidence angles of 20 degrees and the variation in the incidence angle of the reproduction reference beam behaves as indicated by the characteristic curve plotted in FIG. 7.

In addition, the angle variation at the time when the diffraction efficiency becomes zero for the first time in the process in which the angle deviation of the reproduction reference beam is gradually increased from zero is determined by the wavelength $\lambda$ of the light source used for recording, the thickness T of the recording medium (recording material), the incidence angle $\theta_o$ of the signal beam, and the incidence angle $\theta_r$ of the reference beam, and is represented by the following formula:

$$\Delta\theta = (\Delta\theta)_B = \lambda/T(\sin\theta_r + \sin\theta_o \cdot \cos\theta_r/\cos\theta_o) \quad (2).$$

It should be noted here that all the angles shown hereinabove are values in the recording material.

Now, the case where the incidence angle of the reference beam varies at the time of multiple recording of holograms is considered. For example, in the case where the refractive index of a photo-polymer is 1.5, the incidence angle of the signal beam in air is 15 degrees, and the incidence angle of the reference beam is varied from 35 degrees to 65 degrees, $\Delta\theta$ can be determined from the formula (2), and has a characteristic as shown in FIG. 8; thus, $\Delta\theta$ decreases as the incidence angle of the reference beam increases.

The table shown in FIG. 9 shows the variation in the incidence angle of the reference beam at the time of recording a plurality of data pages in a single recording region by the angle multiplex system. The variation in the incidence angle of the reference beam is $\Delta\theta$, which is constant. Therefore, the movable range of the reference beam is represented as:

$$\theta_{total} = (M-1) \times \Delta\theta \quad (3)$$

SUMMARY OF THE INVENTION

As has been described above, in the multiple recording by the angle multiplex system according to the related art, the minimum angle variation (angular pitch) $\Delta\theta$ of the reference beam for securing the angle selectivity is assumed to be constant notwithstanding it is different for each incidence angle of the reference beam as shown in FIG. 8. Therefore, it is inevitable to select the $\Delta\theta$ value which gives minimum crosstalk among all the holograms multiplexed, so that the worst (largest) value is adopted as the angular pitch. Accordingly, in the case where the movable range of a reference beam reflecting mirror is limited, the number of holograms which can be multiplexed would be small.

Thus, there is a need to provide hologram recording and reproduction devices and methods by which the degree of multiplexing of holograms by the angle multiplex system can be enhanced, as compared with the related art, without worsening of crosstalk and within the limited movable range of the reflecting mirror for varying the incidence angle of the reference beam. There is also a need to provide hologram recording and reproduction devices and methods by which the movable range of the reflecting mirror can be made narrower, as compared with the related art, in the case where the degree of multiplexing of holograms is not enhanced.

In order to fulfill the above needs, according to an embodiment of the present invention, there is provided a hologram recording device for multiple recording of data in the same recording region by varying the angle of incidence of a reference beam on a hologram recording medium at the time of recording an interference fringe of the reference beam and a signal beam on the hologram recording medium, wherein the hologram recording device includes a reference beam incidence angle control unit for varying the angular pitch of the incidence angle of the reference beam at the time of multiple recording.

In addition, the reference beam incidence angle control unit according to the embodiment of the present invention varies the angular pitch of the incidence angle of the reference beam according to the incidence angle of the reference angle.

According to another embodiment of the present invention, there is provided a hologram reproduction device for reproducing multiply recorded data by irradiating the same region of a hologram recording medium with a reproduction reference beam while varying the angle of incidence of the reproduction reference beam on the hologram recording medium, wherein the hologram reproduction device includes a reproduction reference beam incidence angle control unit for varying the angular pitch of the incidence angle of the reproduction reference beam so that the incidence angle of the reproduction reference beam will be the same as the incidence angle of a reference beam at the time of recording.

Thus, according to the embodiments of the present invention, in a hologram recording device based on the angle multiplex system, the angular pitch of the incidence angle of the reference beam at the time of multiple recording, which has been constant in the related art, is varied according to the incidence angle, so as to adopt an optimum value in the range for not generating any crosstalk, for example, a minimum angular pitch of the reference angle for securing the angle selectivity. This makes it possible to increase the degree of multiplexing in the case of adopting the same reference beam movable angle, and to reduce the reference beam movable angle in the case of adopting the same degree of multiplexing, as compared with the case where the angular pitch is determined unconditionally.

According to the present invention, in the recording of an interference fringe of a reference beam and a signal beam on a hologram recording medium, at the time of multiple recording of holograms in the same recording region by varying the angle of incidence of the reference beam on the hologram recording medium, the angular pitch of the incidence angle of the reference beam at the time or multiple recording is varied to be an optimum value according to the incidence angle (for example, the minimum angular pitch of the reference angle for securing angle selectivity), whereby the degree of multiplexing of holograms can be efficiently enhanced without worsening of crosstalk within the limited movable range of the reference beam reflecting mirror.

In addition, in the case where the degree of multiplexing of holograms is not enhanced, the movable range of the reference beam reflecting mirror can be reduced, so that optical component parts of the reference beam optical system, particularly movable component parts such as mirrors, can be reduced in size.

Besides, since the variation in the incidence angle of the reference beam is reduced, the variation in the power density of the reference beam is also reduced. Therefore, the variations themselves in the recording and reproduction conditions are also reduced, so that the device can be simplified.

Furthermore, since an angle scheduling in which the angular pitch of the incidence angle of the reproduction reference beam is varied to be an optimum value according to the incidence angle is conducted also at the time of reproduction, an angle correction suitable for reproduction of each page can be achieved, and data reproduction with good S/N can be performed, even if the hologram recording medium is contracted.

BRIEF DESCRIPTION OF THE DRAWINGS

FIG. 9 shows the relationship between the order of recording of each of data pages to be multiply recorded and reference beam incidence angle in the related art.

DETAILED DESCRIPTION OF THE PREFERRED EMBODIMENTS

Figure 1:
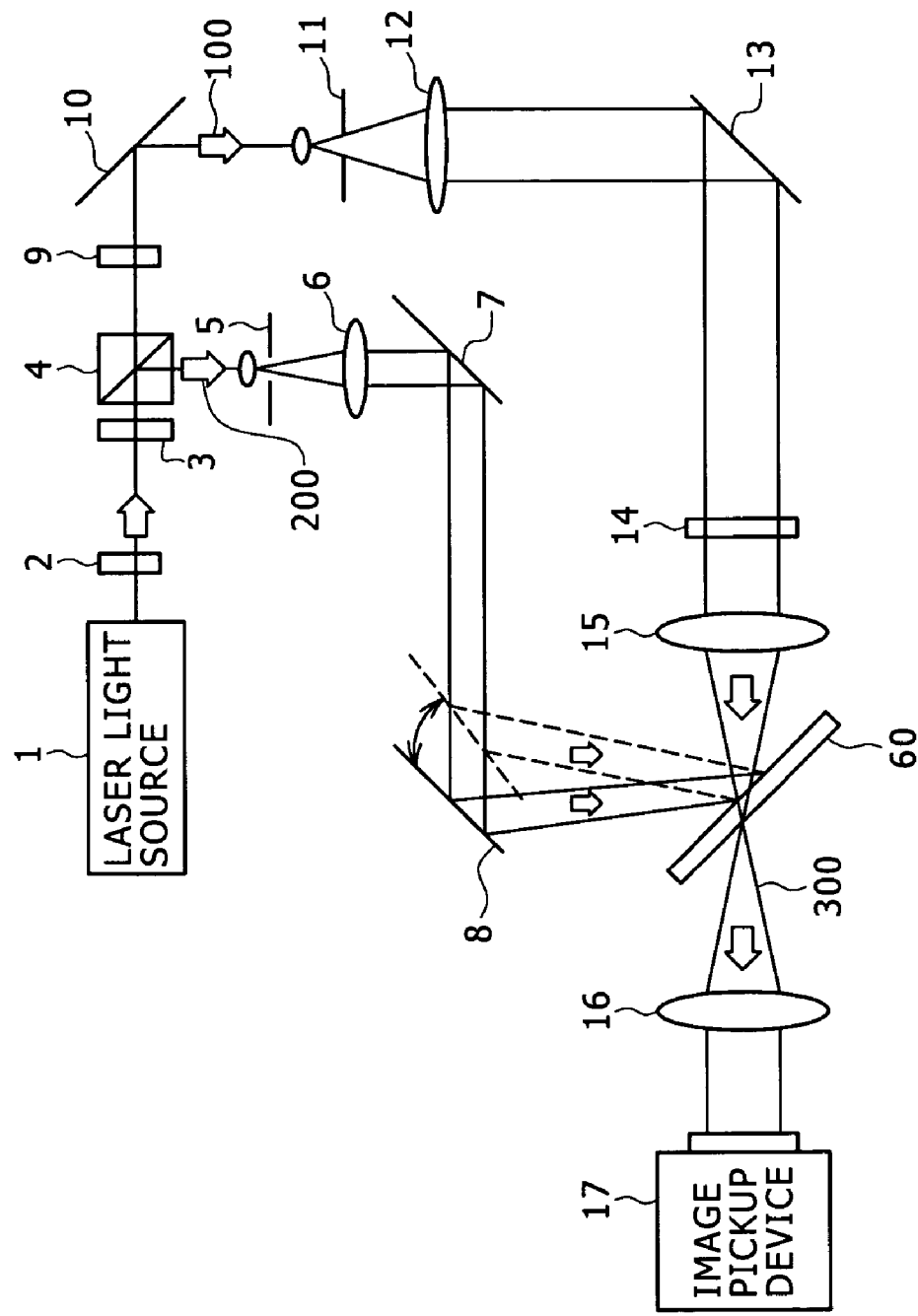
FIG. 1 is a block diagram showing the configuration of a hologram recording and reproduction device according to one embodiment of the present invention.

FIG. 1 is a block diagram showing the configuration of a hologram recording and reproduction device according to one embodiment of the present invention. The hologram recording and reproduction device includes a laser light source 1, a shutter 2, a half-wave plate 3, a polarized beam splitter (PBS) 4, a spatial filter 5, a collimator lens 6, a mirror 7, an angle rotating mirror 8, a shutter 9, a mirror 10, a spatial filter 11, a collimator lens 12, a mirror 13, an SLM 14, a signal beam lens 15, a reproduced beam lens 16, and an image pickup device 17 composed of a CCD, a CMOS or the like, and performs recording of holograms on and reproduction of holograms from a hologram recording medium 60 by the angle multiplex system.

Figure 2:
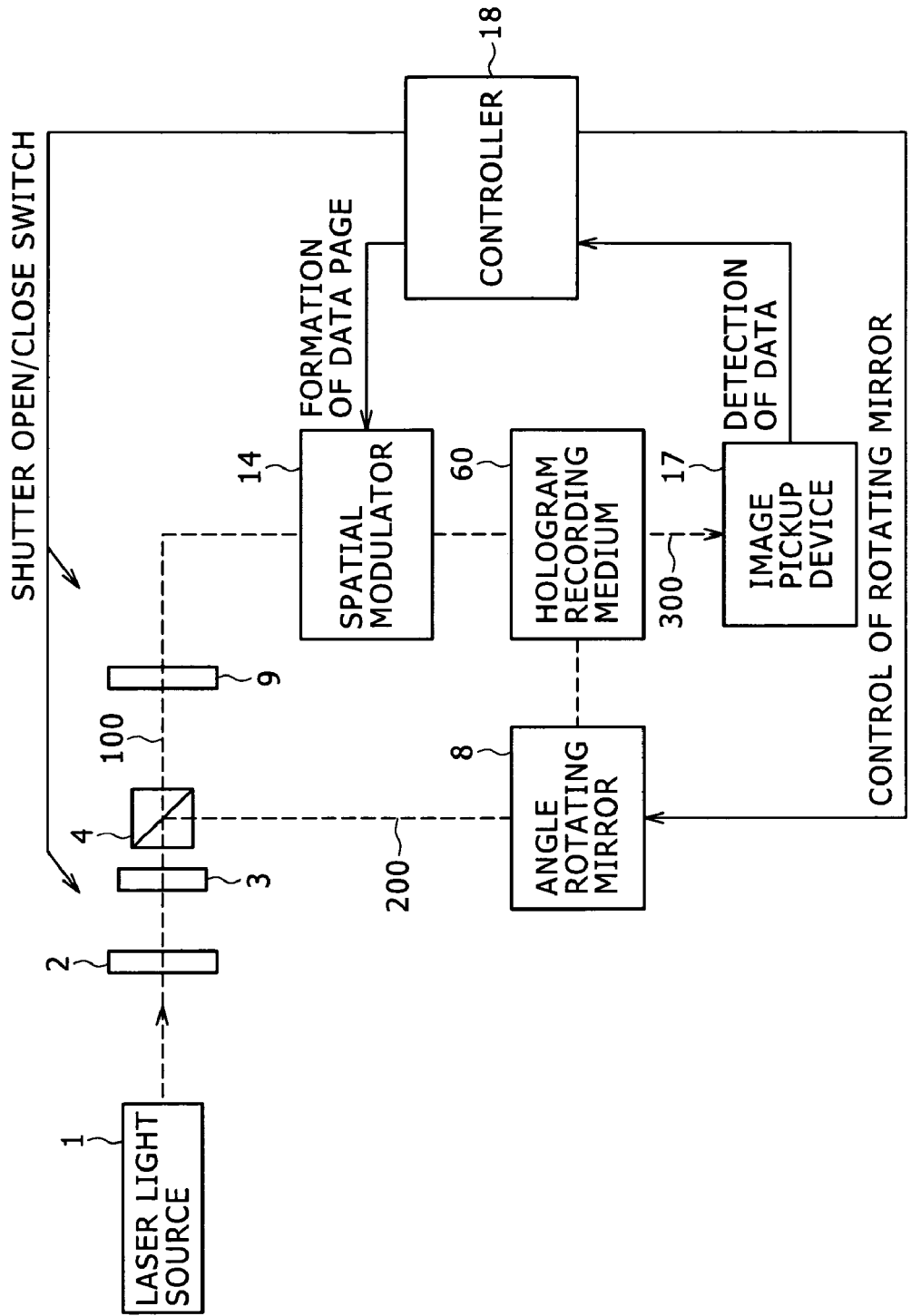
FIG. 2 is a block diagram showing the configuration of a control system of the hologram recording and reproduction device according to the embodiment shown in FIG. 1.

FIG. 2 is a block diagram showing the configuration of a control system of the hologram recording and reproduction device according to this embodiment shown in FIG. 1. A controller 18 of the hologram recording and reproduction device performs individual controls such as opening and closing of the shutters 2 and 9, control of display of data pages on the spatial modulator (SLM) 14, and control of rotation of the angle rotating mirror 8, and also performs control of the device as a whole.

Now, the operations in this embodiment will be described below. In the case of recording data on the hologram recording medium 60, in the condition where the shutter 2 is closed (with the shutter 9 left open), the data page to be recorded is displayed on the spatial modulator (transmitting liquid crystal display) 14, the hologram recording medium 60 is rotated to determine a recording site (recording area), and then the shutter 2 is opened.

This ensures that a coherent laser beam outgoing from the laser light source 1 passes through the shutter 2, is regulated in polarization direction by the half-wave plate 3, and is then incident on the polarized beam splitter (PBS) 4, where it is split into a recording beam 100 and a reference beam 200. The reference beam 200 is converted by the spatial filter 5 and the collimator lens 6 into a parallel beam enlarged in beam diameter, which is changed in propagation direction by the mirror 7, before being incident on the angle rotating mirror 8. By the angle rotating mirror 8, the reference beam 200 is made to be incident on the hologram recording medium 60 at a preset incidence angle. It should be noted here that the angle of incidence of the reference beam 200 on the hologram recording medium 60 is changed by varying the rotating angle of the angle rotating mirror 8 according to a control command from the controller 18. In this case, the angular pitch of the reference beam 200 is scheduled according to the variation in the incidence angle of the reference beam 200, and the rotating angle of the angle rotating mirror 8 is varied according to the scheduling.

On the other hand, the signal beam 100 is incident on the mirror 10 through the shutter 9, is changed in propagation path by the mirror 10, and is converted by the spatial filter 11 and the collimator lens 12 into a parallel beam enlarged in beam diameter to a predetermined beam diameter. The signal beam 100 is then incident on the mirror 13, where it is changed in going path, to be incident on the spatial modulator 14. A data page is displayed on the spatial modulator 14, and the passage of the signal beam 100 through the spatial modulator 14 results in spatial modulation. The signal beam 100 thus spatially modulated passes through the signal beam lens 15 and is condensed in the hologram recording medium 60, to be superposed on the reference beam 200, and the light intensity distribution of the resulting interference fringe is recorded in the hologram recording medium 60 as a hologram, followed by closing of the shutter 2. The reference beam 200 and the signal beam 100 radiated into the hologram recording medium 60 interferes with each other in the hologram recording medium 60, and the light intensity distribution of the resulting interference fringe is recorded in the recording medium as a hologram.

Thereafter, a data page to be recorded next is displayed on the spatial modulator 14, and the angle rotating mirror 8 is slightly rotated to change the incidence angle of the reference beam 200. Then, with the shutter 2 opened, the data page to be recorded next is recorded in the same recording region of the hologram recording medium 60 as above in an angle multiplex mode. This procedure is repeated, and, when a predetermined degree of multiplexing is reached, the hologram recording medium 60 is moved, and the same multiple recording as above is applied to the next recording region.

At the time of reproducing the hologram recorded as above-mentioned, the shutter 2 is opened in the condition where the signal beam shutter 9 is closed, whereby the reproduction reference beam 200 is radiated to the position where the hologram has been recorded. The reproduced beam 300 generated by irradiation with the reproduction reference beam 200 is condensed through the reproduced beam lens 16 onto the image pickup device 17, and the image pickup device 17 gives a reproduced image signal. Next, the angle rotating mirror 8 is rotated to change the incidence angle of the reference beam 200 on the hologram recording medium 60, a reproduced beam 300 corresponding to another data page is generated from the same recording region, and the next reproduced image data is obtained from the image pickup device 17. Incidentally, the angular pitch of the reproduction reference beam 200 is scheduled according to the change in the incidence angle of the reproduction reference beam 200, and the rotating angle of the angle rotating mirror 8 is varied according to the scheduling, in the same manner as at the time of recording.

Figures 3, 4:
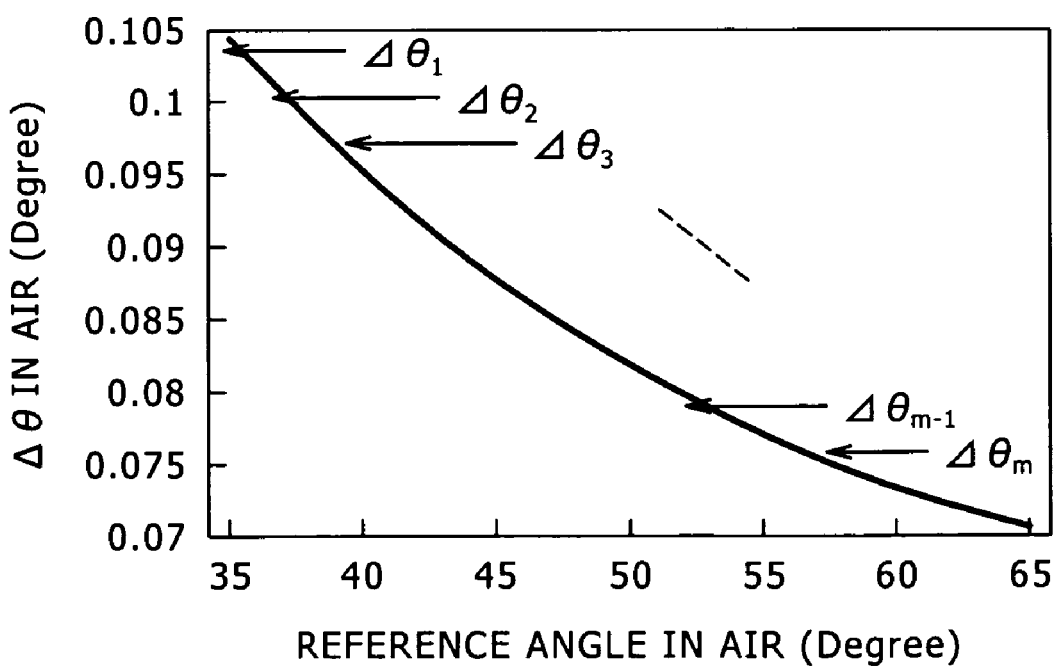
FIG. 3 shows the relationship between the order of recording of each of data pages to be multiply recorded and reference beam incidence angle.
FIG. 4 is a characteristic diagram showing the relationship between incidence angle and angular pitch of the reference beam.

Now, a control such that the angular pitch is changed for each incidence angle of the reference beam 200 by scheduling the angular pitch of the reference beam 200 will be described. In the controller 18 of the recording device in this embodiment, at the time of recording m sheets of data pages in a single recording region, a scheduling as shown in the table in FIG. 3 is conducted so that the angular pitch of the reference beam 200 differs depending on the order of recording in the multiple recording. Incidentally, the angle control according to the reference beam incidence angle series shown in the table in FIG. 3 will be referred to as angle scheduling. In this case, the movable range θtotal of the reference beam reflecting mirror in the angle multiplex system is as follows.

$$\theta total = \Delta\theta_1 + \Delta\theta_2 \ldots + \Delta\theta_{m-1} \quad (4)$$

Thus, unlike in the past, the angular pitch in this embodiment is not constant but is determined as shown in FIG. 4, i.e., is varied according to the incidence angle of the reference beam 200. In short, the angular pitch of the reference beam 200 is set to a minimum angular pitch of the reference beam 200 for securing angle selectivity, for each incidence angle of the reference beam 200. Here, let the $\Delta\theta m$ obtained according to the change in the incidence angle of the reference beam 200 according to the formula (2) be the angular pitch, then the following relationship exists.

$$\Delta\theta = \Delta\theta_1 > \Delta\theta_2 > \Delta\theta_3 > \ldots > \Delta\theta_{m-1} > \Delta\theta_m \quad (5)$$

From the above discussion, it is seen that, comparing the system in the related art with the system in this embodiment of the present invention as to the movable range of the mirror, there is the relationship of θtotal(related art)>θtotal(present invention), and in the case of multiplexing the same number of data pages, the movable range of the mirror can be narrower in the angle multiplex system according to the present invention than in the system according to the related art. On the contrary, in the case of adopting the same mirror movable range, the degree of multiplexing can be increased and, hence, the recording density can be enhanced in the system according to this embodiment, as compared with the system according to the related art. Incidentally, at the time of the angle scheduling, the incidence angle series of the reference beam corresponding to the recordings of from data page 1 to the data page m may be in the order of $\{\theta_1, \theta_2, \ldots, \theta_m\}$ or $\{\theta_m, \theta_{m-1}, \ldots, \theta_1\}$.

<Snell's Law>

Assuming θo=θr=θ inside in the formula (2), the Bragg's angle selectivity in the recording material is represented as follows:

$$\Delta\theta inside = \lambda/(2T \sin \theta inside) \quad (6).$$

In the angle multiplex recording device, the reference beam is refracted according to the Snell's law when entering the recording material.

Figures 5, 6:
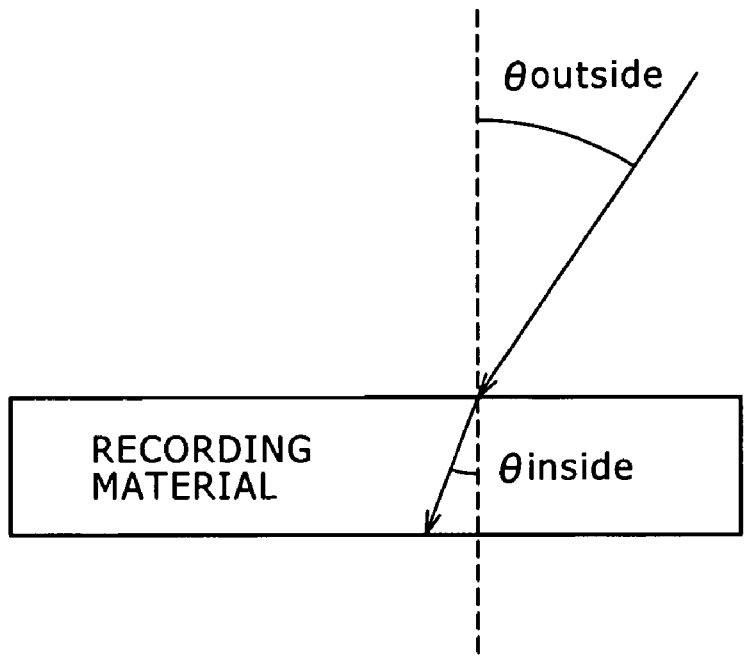
FIG. 5 illustrates the Snell's law.
FIG. 6 shows the relationship between the order of reproduction of each of the data pages multiply recorded and reference beam incidence angle.
Figure 7:
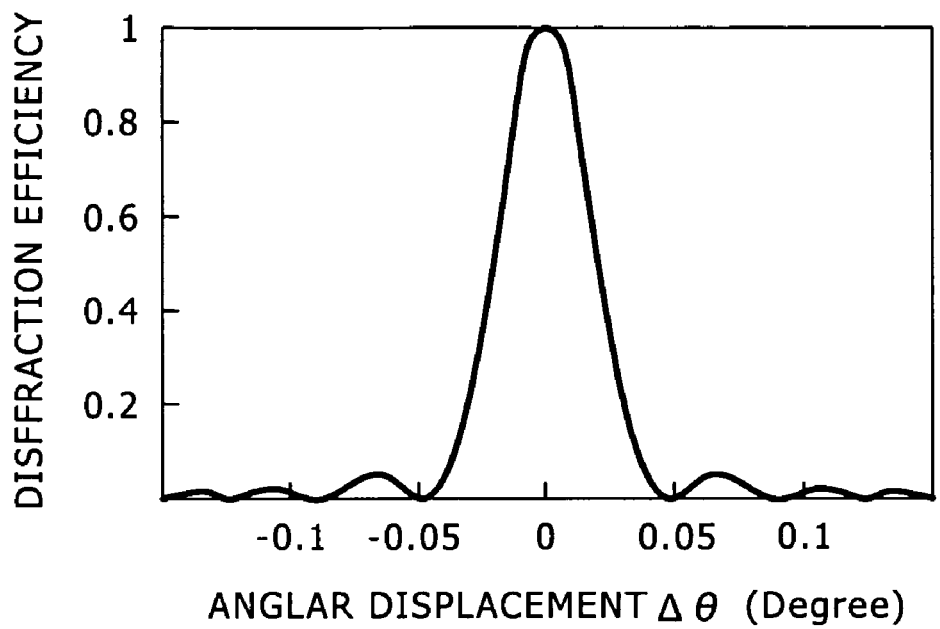
FIG. 7 is a characteristic diagram showing the relationship between diffraction efficiency and variation in incidence angle of reproduction reference beam.
Figure 8:
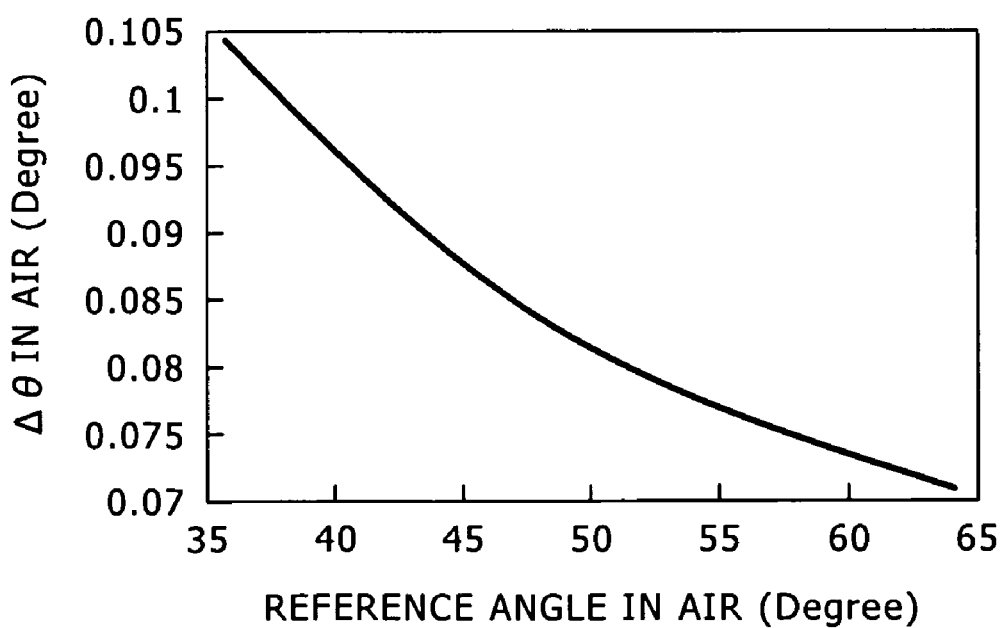
FIG. 8 is a characteristic diagram showing the relationship between incidence angle and angular pitch of the reference beam.

As shown in FIG. 5, let the refractive index in the recording material be n (in air, 1), let the incidence angle of light in the recording medium be θinside, and let the incidence angle in air be θoutside, then the law is represented as follows:

$$n \sin \theta inside = \sin \theta outside \quad (7).$$

Since the variation in the incidence angle of the reference beam is obtained by the rotation of the mirror disposed in the device (in air), it may be necessary for the angular pitch to be scheduled according to the angle selectivity Δθoutside in air.

$$\Delta\theta outside = d\theta outside/d\theta inside \Delta\theta inside \quad (8)$$

Namely, it suffices that the series of Δθ outside obtained by computing the formulas (7) and (8) based on the reference beam incidence angle θ in each step of multiple recording is used as the angle scheduling.

The case of reproducing the data pages recorded in the hologram recording medium 60 by the angle multiplex system as above-described will be described. Since the reproduction reference beam 200 at the time of reproduction must have the same incidence angle as that of the reference beam at the time of recording, the angular pitch of the reproduction reference beam 200 is varied according to the incidence angle thereof in the same manner as at the time of recording, so that the same scheduling as in FIG. 3 is used.

However, in some cases of reproduction, it may be necessary to take into account the contraction of the hologram recording medium 60. In general, a photopolymer undergoes contraction due to polymerization of monomers contained in the material. In the case where reproduction must be conducted by deviating the angle of the reproduction reference beam by $\delta\theta$ from the angle of the recording reference beam, for the purpose of angular correction of the contraction, the angle scheduling for the reproduction reference beam is as shown in the table in FIG. 6. Incidentally, since the contraction begins during recording, the contraction correction amount $\delta\theta$ may in some cases be different depending on the data page. In such an instance, it suffices to perform the angle scheduling based on the different values of $\delta\theta$.

According to this embodiment, multiple recording is conducted by setting the angular pitch of the reference beam incidence angle at the time of recording based on the angle multiplex system to an optimum value according to the reference beam incidence angle, for example, to a minimum angular pitch of the reference beam for securing the angle selectivity, and varying the angular pitch for each reference beam incidence angle. This ensures that, when the degree of multiplexing is the same as in the related art, it is possible to narrow the movable range of the mirror as compared with the system according to the related art, without worsening of crosstalk, to reduce the size of optical component parts in the reference beam optical system, and to reduce the size of the angle rotating mirror 8. In addition, since the variation in the incidence angle of the reference beam 200 is reduced, the variation in the power density of the reference beam is also reduced; therefore, the variations themselves of recording and reproduction conditions are also reduced, which promises simplification of the device. Besides, when the angle scheduling is performed, an angle correction suitable for reproduction of each data page can be performed even if the recording material is contracted, and, therefore, data reproduction with good S/N can be achieved. On the contrary, when the movable range of the mirror is the same as in the related art, it is possible to increase the degree of multiplexing and, hence, to enhance the recording density, without worsening of crosstalk, as compared with the related art.

Incidentally, the present invention is not limited to the above-described embodiment, and various modifications are possible as to specific configurations, functions, actions and effects within the scope of the gist of the invention.

What is claimed is:

1. A hologram recording device configured to perform multiple recording of data in a same recording region by varying an angle of incidence of a reference beam on a hologram recording medium at a time of recording an interference fringe of said reference beam and a signal beam on said hologram recording medium, said hologram recording device comprising:
    a reference beam incidence angle control unit configured to determine a plurality of angles of incidence of the reference beam within a predetermined range, by determining for at least a first angle of incidence of the plurality of angles of incidence a first angular pitch based on the first angle of incidence, and determining a second angle of incidence of the plurality of the angles of incidence by adding the first angular pitch to the first angle of incidence, and determining a second angular pitch based on the second angle of incidence, wherein respective angular pitches correspond to respective differences between the plurality of angles of incidence and said respective angular pitches have varying values.

2. The hologram recording device as set forth in claim 1, wherein said reference beam incidence angle control unit is configured to determine a respective angular pitch on the basis of the refractive index of air in which said reference beam propagates, a refractive index of said hologram recording medium, and a respective incidence angle.

3. The hologram recording device as set forth in claim 1, wherein each respective angular pitch value is greater than a respective angular pitch value for a subsequently recorded interference fringe.

4. A hologram reproduction device configured to reproduce multiply recorded data by irradiating a same region of a hologram recording medium with a reproduction reference beam while varying the angle of incidence of said reproduction reference beam on said hologram recording medium, wherein said hologram reproduction device comprises:
    a reproduction reference beam incidence angle control unit configured to determine a plurality of angles of incidence of the reproduction reference beam within a predetermined range to be the same as a plurality of incidence angles of a reference beam at a time of recording, by determining for at least a first angle of incidence of the plurality of angles of incidence a first angular pitch based on the first angle of incidence, and determining a second angle of incidence of the plurality of the angles of incidence by adding the first angular pitch to the first angle of incidence, and determining a second angular pitch based on the second angle of incidence, wherein respective angular pitches correspond to respective differences between the plurality of angles of incidence and said respective angular pitches have varying values.

5. The hologram reproduction device as set forth in claim 4, wherein said reproduction reference beam incidence angle control unit is configured to correct a respective incidence angle of said reproduction reference beam on said hologram recording medium according to a contraction of said hologram recording medium.

6. A hologram recording method for recording an interference fringe of a reference beam and a signal beam on a hologram recording medium, comprising:
    determining a plurality of angles of incidence of the reference beam within a predetermined range, by determining for at least a first angle of incidence of the plurality of angles of incidence a first angular pitch based on the first angle of incidence, and determining a second angle of incidence of the plurality of the angles of incidence by adding the first angular pitch to the first angle of incidence, and determining a second angular pitch based on the second angle of incidence, wherein respective angular pitches correspond to respective differences between the plurality of angles of incidence and said respective angular pitches have varying values.

7. A hologram reproducing method for reproducing multiply recorded data by irradiating a same region of a hologram recording medium with a reproduction reference beam, said method comprising:
    determining a plurality of angles of incidence of the reproduction reference beam within a predetermined range to be the same as a plurality of incidence angles of a reference beam at a time of recording, by determining for at least a first angle of incidence of the plurality of angles of incidence a first angular pitch based on the first angle of incidence, and determining a second angle of incidence of the plurality of the angles of incidence by adding the first angular pitch to the first angle of incidence, and determining a second angular pitch based on the second angle of incidence, wherein respective angular pitches correspond to respective differences between the plurality of angles of incidence and said respective angular pitches have varying values.

8. The hologram reproducing method as set forth in claim 7, wherein a respective incidence angle of the reproduction reference beam is corrected according to a contraction of said hologram recording medium.

* * * * *